Patented Nov. 24, 1931

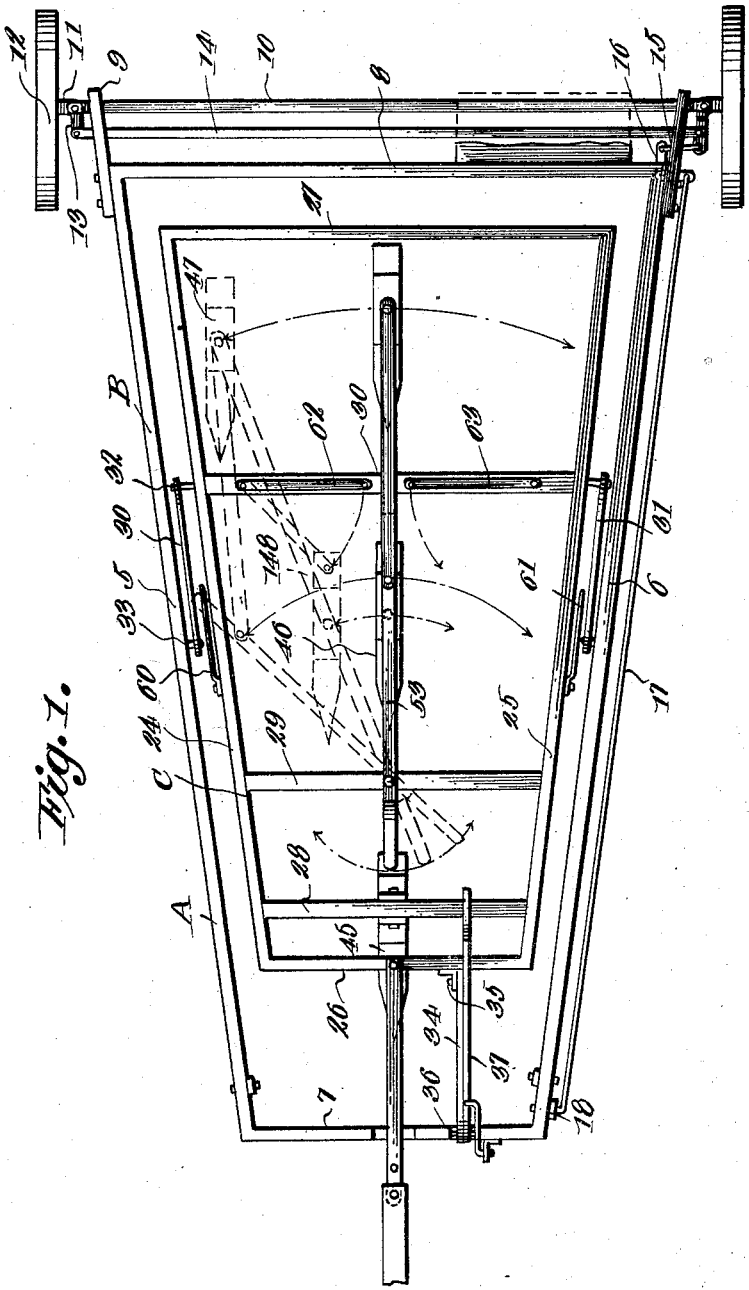

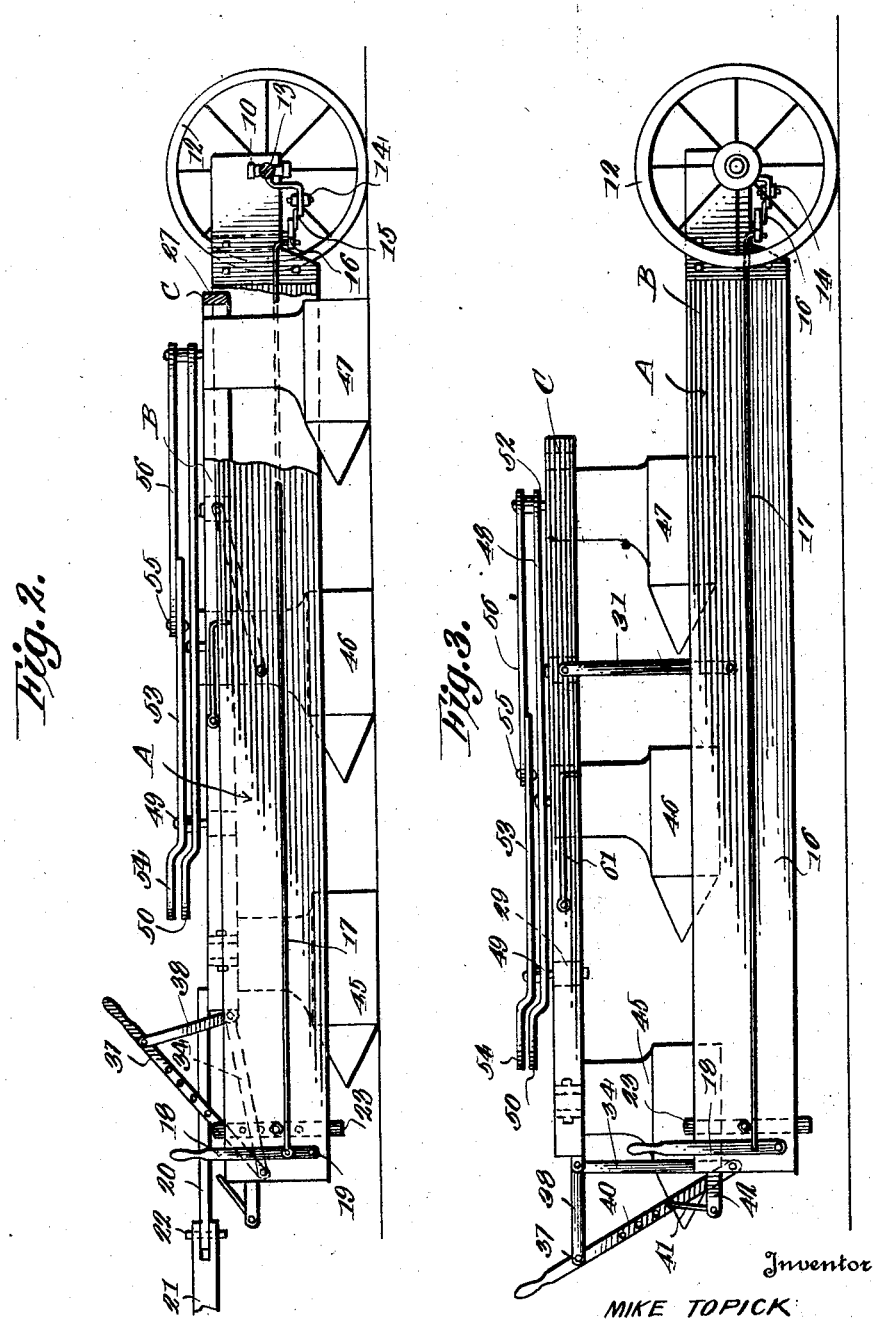

1,833,763

UNITED STATES PATENT OFFICE

MIKE TOPICK, OF SMICKSBURGH, PENNSYLVANIA

HILLSIDE PLOW

Application filed March 16, 1929. Serial No. 347,709.

This invention appertains to agricultural machinery and more particularly to a novel gang plow particularly adaptable for use on hill sides and the like.

One of the primary objects of my invention is to provide a hill side plow embodying a main wheeled supporting frame having associated therewith in a novel manner, a supplemental frame on which the plows are supported, the supplemental frame being so arranged as to permit the same to be raised and lowered on the main frame, whereby the depth of the plow can be regulated and whereby the plows can be raised above the ground so as to facilitate the pulling of the machine from one part of the farm to the other.

Another important object of my invention is the provision of novel means for moving certain of the plow bottoms of the gang of plows on the supplemental frame, whereby the mentioned plow bottoms can be swung either to the right or left of the front or leading stationary plow bottom in proper relation relative thereto.

A further object of my invention is the provision of novel means for bracing the plow bottoms when the same are in their adjusted position either on the right or left of the longitudinal center of the supplemental frame and for locking the plow bottoms in their adjusted position.

A still further object of my invention is to provide an improved hill side plow of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of my improved device,

Figure 2 is a side elevation of the same showing parts thereof broken away and in section, Figure 3 is a side elevation of my improved device showing the supplemental frame in its raised position for raising the plow bottoms above the ground to facilitate the moving of the device from one field to another.

Referring to the drawings in detail, wherein similar reference characters designate corresponding parts throughout the several views, the letter A generally indicates my improved hill side plow which comprises a main frame B and a supplemental frame C.

The main frame B comprises side bars 5 and 6 which are connected at their forward ends to a front beam 7 and at their rear ends to a rear beam 8. The side beams 5 and 6 are arranged in converging relation relative to one another and inclined inwardly toward the front beam 7. Connected to the rear of the frame B by suitable brackets or the like 9, is the rear dead axle 10, to the ends of which are pivotally connected stub axles 11. These stub axles 11 support the rotatable rear wheels 12. The arms 13 of the stub axles 11 are connected together by suitable links 14, so that movement of one stub axle will be transmitted to the other.

One arm 13 of one stub axle 11 is extended beyond the link 14 and is connected by means of a pivot link 15 with one arm of a bell crank 16, the opposite arm of which has pivotally connected thereto an operating rod 17, extending in parallel relation to the side beam 6 to the front of the frame. The front end of the rod 17 is pivotally connected to an operating lever 18, connected to the side beam 6 by the use of a suitable pivot pin or the like 19. Thus by manipulating the lever 18, the rear wheels can be steered or changed in the direction of travel of the device. The lever 18 can be held in an adjusted position in any preferred way, such as by a pawl and quadrant mechanism. The front of the frame can be provided with supporting wheels or supported directly by the draft animals or tractor as the case may be. As shown, the device is provided with a draw beam 20 which can be connected to the draw beams 21 of a suitable tractor and these beams can be connected together by a wooden or other frangible pin 22, which will break if the plow bottoms hit a rigid object such as a rock, tree stump or the like. If preferred, the side beams 5 and 6 adjacent to their forward ends can be provided with adjustable legs 23 which can be moved to a lowered position for holding the front of the frame raised when the device is unhooked from the tractor and not being used.

The supplemental frame C is arranged within the main frame B and this supplemental frame also includes side beams 24 and 25 connected at their forward ends to a front beam 26 and at their ends to a rear cross beam 27. As shown, the side beams 24 and 25 gradually incline inwardly toward the front bar 26. This supplemental frame C can be braced, if so desired, by intermediate cross beams or bars 28, 29, and 30.

The supplemental frame C is connected to the main frame B, so that the same can be raised and lowered, and as shown I have provided a rear pair of links 30 and 31 arranged on opposite sides of the supplemental frame. The links 30 and 31 are connected at their rear ends to the side bars 24 and 25 of the supplemental frame C by means of pivot pins 32 and at their forward ends to the side bars 5 and 6 of the main frame B by pivot pins 33. The forward end of the supplemental frame C is connected in a similar manner to the front of the main frame and a link 34 is provided which is pivotally connected to the front bar 26 of the supplemental frame by means of a pivot pin 35 and to the front bar 7 of the main frame B by means of a pivot pin 36. In order to raise and lower the supplemental frame C on the links 30, 31, and 34 an operating hand lever 37 is employed which is pivotally connected to the front main frame bar 7. If desired, this operating hand lever 37 can be connected on the pivot pin 36 as shown. The hand lever 37 is operatively connected to the supplemental frame C by means of a link 38 and this link is connected to the operating hand lever 37 by means of a pivot pin 39 and to the supplemental frame by a similar pivot pin, the pivot pin 35 being employed for this purpose. In order to hold the adjusting hand lever 37 in any preferred adjusted position, the same can be provided with a plurality of spaced openings 40, to any one of which can be inserted a holding hook 41 pivotally carried by a bracket 42 secured to the front frame bar 7 of the main frame B.

The supplemental frame C supports a plurality of plow bottoms, and as shown, I have provided a front plow bottom 45, an intermediate plow bottom 46, and a rear plow bottom 47. The front plow bottom 45 is rigidly connected in any desired way to the front intermediate cross bar 28 of the supplemental frame. The intermediate and rear plow bottoms 46 and 47 are connected with the supplemental frame in a novel manner so that the same can be either moved to the left or to the right of the longitudinal center of the machine on either side of the front rigid plow bottom 47. As shown, I have provided a supporting beam or lever 48 which is rockably mounted at a point intermediate its ends adjacent to the front end thereof by a pivot pin 49 carried by the intermediate frame bar 29. The front end of the lever or beam 48 forward of the pin 49 is provided with a manipulating handle 50. The plow bottoms 46 and 47 are pivotally supported by the beam or lever 48 in any desired way such as by upstanding headed pins or bolts 52. By grasping the handle 50 the lever or beam 48 can be swung on its pivot 49 and thus move the plow bottoms 46 and 47 to the desired position. In order to facilitate the movement of the plow bottoms 46 and 47 to the desired position, I provide a second operating lever 53, which can be rockably mounted on the pivot pin 49. The front end of the manipulating lever 53 is also provided with a manipulating handle 54. Pivotally connected by means of a pivot pin 55 with the lever 53 adjacent to the rear end thereof is a link 56 which is in turn connected at its rear end to a pivot bolt 52. Thus, by this construction, by grasping the handles 50 and 54 and swinging the same to right or left as the case may be, the plow bottoms 46 and 47 can be moved on either side of the longitudinal axis of the frame.

After the levers have been swung to the desired position, and the plow bottoms moved to the right or left as the case may be, the same are held against backward and swinging movement in any desired adjusted position, by means of hooks 60 and 61 which are pivotally mounted on the frame bars 24 and 25 of the supplemental frame C. When the plows are swung to the right of the longitudinal center of the frame, the hook 60 can be hooked over the extended end of the lever 53 and thus hold the same against rearwardly swinging movement. If the plow bottoms 46 and 47 are swung to the left, then the hook 61 can be hooked over the extended end of the lever 53. If preferred, and in order to further brace the plows pivoted links 62 and 63 are carried by the intermediate brace bars 30 and either the link 62 or 63 as the case may be, and according to which side of the plow bottoms are swung, can be connected to the intermediate plow bottom 46, as shown in dotted lines in Figure 1 of the drawings.

From the foregoing description, it can be seen that I have provided an improved hill side plow which can be accurately steered and in which the plow bottoms can be adjusted laterally of the longitudinal center of the frame and also in a vertical plane.

Changes in details may be made without departing from the spirit or the scope of this invention, but what I claim as new is:

1. A hill side plow comprising a main frame, having dirigible supporting wheels, a supplemental frame, links hingedly connecting the supplemental frame with the main frame, means for raising and lowering the supplemental frame bodily on the main frame parallel therewith, plow bottoms carried by the supplemental frame one in back of the other, the leading plow bottom being rigidly connected with the supplemental frame, and means for simultaneously adjusting the remaining plow bottoms laterally on the supplemental frame.

2. A hill side plow comprising a main frame, having dirigible supporting wheels, a supplemental frame, links hingedly connecting the supplemental frame with the main frame, means for raising and lowering the supplemental frame bodily on the main frame and parallel therewith, plow bottoms carried by the supplemental frame one behind the other, the leading plow bottom being rigidly connected with the supplemental frame, means for simultaneously adjusting the remaining plow bottoms laterally on the supplemental frame, and means for bracing and holding the last mentioned plow bottoms in adjusted position.

3. A hill side plow comprising a main frame including side and end bars, a supplemental frame arranged within the main frame including side and end bars, side links pivotally connecting the side bars of the main and supplemental frames together, a front link pivotally connected to the front bars of the main and supplemental frames, an adjusting lever rockably carried by the front bar of the main frame, an adjusting link rockably connecting the adjusting lever with the supplemental frame, means for holding the adjusting lever in an adjusted position, a front plow bottom connected with the supplemental frame, a movable beam pivotally carried by the supplemental frame, plow bottoms pivotally connected to said beam one in back of the other, a beam adjusting lever pivotally mounted on the supplemental frame, a link pivotally connecting the rear end of the last mentioned beam adjusting lever to the rearmost plow bottom, and means for holding the plow bottoms against movement and in an adjusted position.

In testimony whereof I affix my signature.

MIKE TOPICK.